(12) United States Patent
Singh et al.

(10) Patent No.: US 9,882,241 B2
(45) Date of Patent: *Jan. 30, 2018

(54) HIGH CAPACITY CATHODE

(71) Applicant: Seeo, Inc., Hayward, CA (US)

(72) Inventors: Mohit Singh, Berkeley, CA (US); Hany Basam Eitouni, Oakland, CA (US)

(73) Assignee: Seeo, Inc., Hayward, CA (US)

(*) Notice: Subject to any disclaimer, the term of this patent is extended or adjusted under 35 U.S.C. 154(b) by 242 days.

This patent is subject to a terminal disclaimer.

(21) Appl. No.: 14/700,260

(22) Filed: Apr. 30, 2015

(65) Prior Publication Data

US 2015/0263382 A1    Sep. 17, 2015

Related U.S. Application Data

(63) Continuation-in-part of application No. 13/056,745, filed as application No. PCT/US2009/052511 on Jul. 31, 2009, now Pat. No. 9,054,372.

(Continued)

(51) Int. Cl.
*H01M 4/36* (2006.01)
*H01M 4/131* (2010.01)
(Continued)

(52) U.S. Cl.
CPC ....... *H01M 10/0565* (2013.01); *H01M 4/131* (2013.01); *H01M 4/134* (2013.01);
(Continued)

(58) Field of Classification Search
CPC ...... H01M 4/131; H01M 4/134; H01M 4/136; H01M 4/34; H01M 4/58; H01M 4/485; H01M 10/0525; H01M 10/0565
See application file for complete search history.

(56) References Cited

U.S. PATENT DOCUMENTS 6,027,836 A    2/2000 Okada et al.
6,051,343 A *  4/2000 Suzuki ................. H01M 10/08
                                                429/303

(Continued)

FOREIGN PATENT DOCUMENTS

EP            1770817 A2    4/2007
WO    WO 2005/013394 A1    2/2005
(Continued)

OTHER PUBLICATIONS

U.S. Appl. No. 61/056,688, filed May 28, 2008, Seeo.
(Continued)

*Primary Examiner* — Kenneth J Douyette
(74) *Attorney, Agent, or Firm* — Michael Best & Friedrich LLP (57) ABSTRACT

A novel electrode for a battery is provided. The electrode may contain active material nanoparticles embedded in a solid polymer electrolyte. The electrolyte can also act as a binder for the nanoparticles. A plurality of voids is dispersed throughout the solid polymer electrolyte. The electrode may also contain electronically conductive carbon particles. Upon charging or discharging of the cell, the nanoparticles expand as they take up active material ions. The solid polymer electrolyte can deform reversibly in response to the expansion of the nanoparticles and transfer the volume expansion to the voids.

40 Claims, 8 Drawing Sheets

Related U.S. Application Data (60) Provisional application No. 61/085,790, filed on Aug. 1, 2008.

(51) Int. Cl.

| | | |
|---|---|---|
| *H01M 4/134* | (2010.01) | |
| *H01M 10/0565* | (2010.01) | |
| *H01M 10/0525* | (2010.01) | |
| *H01M 4/136* | (2010.01) | |
| *H01M 4/58* | (2010.01) | |
| *H01M 4/485* | (2010.01) | |
| *H01M 4/525* | (2010.01) | |
| *H01M 4/38* | (2006.01) | |
| *H01M 4/62* | (2006.01) | |
| *H01M 4/02* | (2006.01) | |

(52) U.S. Cl.
CPC ........... *H01M 4/136* (2013.01); *H01M 4/364* (2013.01); *H01M 4/38* (2013.01); *H01M 4/485* (2013.01); *H01M 4/525* (2013.01); *H01M 4/5815* (2013.01); *H01M 4/5825* (2013.01); *H01M 4/623* (2013.01); *H01M 10/0525* (2013.01); *H01M 2004/021* (2013.01); *H01M 2004/028* (2013.01); *H01M 2300/0082* (2013.01)

(56) References Cited

U.S. PATENT DOCUMENTS

| | | | |
|---|---|---|---|
| 6,130,007 A * | 10/2000 | Bi | B82Y 30/00 423/594.17 |
| 6,645,675 B1 | 11/2003 | Munshi | |
| 7,226,702 B2 | 6/2007 | Oh et al. | |
| 7,407,727 B2 | 8/2008 | Sugiyama | |
| 7,816,031 B2 | 10/2010 | Cui | |
| 8,225,824 B2 | 7/2012 | Eliuk et al. | |
| 8,257,866 B2 | 9/2012 | Loveness | |
| 8,450,012 B2 | 5/2013 | Cui | |
| 8,556,996 B2 | 10/2013 | Loveness | |
| 8,563,168 B2 | 10/2013 | Balsara | |
| 8,598,273 B2 | 12/2013 | Eitouni | |
| 8,637,185 B2 | 1/2014 | Berdichevsky | |
| 8,691,928 B2 | 4/2014 | Hsieh | |
| 9,054,372 B2 | 6/2015 | Singh et al. | |
| 2004/0101753 A1 * | 5/2004 | Hwang | H01M 4/366 429/218.1 |
| 2004/0157122 A1 * | 8/2004 | Naoi | C08G 75/14 429/213 |
| 2005/0236732 A1 | 10/2005 | Brosch | |
| 2006/0057463 A1 | 3/2006 | Gao | |
| 2006/0115732 A1 | 6/2006 | Zaghib | |
| 2006/0159997 A1 | 7/2006 | Sunagawa | |
| 2006/0204846 A1 | 9/2006 | Sunagawa | |
| 2007/0087268 A1 | 4/2007 | Kim | |
| 2007/0154805 A1 | 7/2007 | Zaghib | |
| 2007/0202403 A1 | 8/2007 | Oh | |
| 2008/0038638 A1 | 2/2008 | Zhang et al. | |
| 2008/0044732 A1 | 2/2008 | Salot et al. | |
| 2008/0090152 A1 | 4/2008 | Kohsuzu | |
| 2008/0145752 A1 | 6/2008 | Hirose | |
| 2008/0166634 A1 | 6/2008 | Kim | |
| 2008/0206651 A1 | 8/2008 | Kawase | |
| 2010/0285358 A1 | 11/2010 | Cui | |
| 2010/0330419 A1 | 12/2010 | Cui | |
| 2010/0330421 A1 | 12/2010 | Cui | |
| 2010/0330423 A1 | 12/2010 | Cui | |
| 2011/0111296 A1 | 5/2011 | Berdichevsky | |
| 2011/0111300 A1 | 5/2011 | Delhagen | |
| 2011/0111304 A1 | 5/2011 | Cui | |
| 2011/0136017 A1 | 6/2011 | Singh et al. | |
| 2011/0159365 A1 | 6/2011 | Loveness | |
| 2011/0171502 A1 | 7/2011 | Kottenstette | |
| 2011/0206994 A1 | 8/2011 | Balsara | |
| 2011/0229761 A1 | 9/2011 | Cui | |
| 2011/0287318 A1 | 11/2011 | Loveness | |
| 2011/0318649 A1 | 12/2011 | Eitouni | |
| 2012/0045670 A1 | 2/2012 | Stefan | |
| 2012/0070741 A1 | 3/2012 | Liu | |
| 2012/0100438 A1 | 4/2012 | Fasching | |
| 2012/0121989 A1 | 5/2012 | Roberts | |
| 2012/0183856 A1 | 7/2012 | Cui | |
| 2012/0301789 A1 | 11/2012 | Loveness | |
| 2013/0011736 A1 | 1/2013 | Loveness | |
| 2013/0320582 A1 | 12/2013 | Cui | |
| 2013/0344383 A1 | 12/2013 | Loveness | |

FOREIGN PATENT DOCUMENTS

| | | | |
|---|---|---|---|
| WO | WO 2007/142731 A2 | 12/2007 | |
| WO | WO 2008/021961 A1 | 2/2008 | |
| WO | WO 2009/092058 A1 | 7/2009 | |
| WO | WO 2009/146340 A1 | 12/2009 | |
| WO | WO 2010/083325 A1 | 7/2010 | |
| WO | WO 2010/083330 A1 | 7/2010 | |

OTHER PUBLICATIONS

U.S. Appl. No. 61/091,626, filed Aug. 25, 2008, Hsieh et al.
U.S. Appl. No. 61/145,507, filed Jan. 16, 2009, Seeo.
U.S. Appl. No. 61/145,518, filed Jan. 16, 2009, Seeo.
U.S. Appl. No. 61/158,241, filed Mar. 6, 2009, Eitouni et al.
U.S. Appl. No. 61/158,257, filed Mar. 6, 2009, Eitouni et al.
U.S. Appl. No. 14/699,000, filed Apr. 29, 2015, Singh et al.
Aifantis, K.E., Hackney, SA, Dempsey, J.P., 'Design criteria for nanostructured Li-ion batteries,' Journal of Power Sources, vol. 165, p. 874-879, Feb. 6, 2007.
Chan, et al., "High-performance lithium battery anodes using silicon nanowires," nature nanotechnology I vol. 3 I Jan. 2008, p. 31.
David Zaziski, et al, "Critical Size for Fracture during Solid-Solid Phase Transformations, " Nano Letters 2004, vol. 4, No. 5,943-946.
Gao, et al. Alloy formation in nanostructured silicon. Adv. Mater. 13,816-819 (2001).
Hong Li, et al, "The crystal structural evolution of nano-Si anode caused by lithium insertion and extraction at room temperature," Solid State Ionics 135 (2000) 181-191.
International search report and written opinion dated Sep. 22, 2009 for PCT Application No. US2009/052511.
Julia Deneen, et al, "In situ deformation of silicon nanospheres," J Mater Sci (2006) 41:4477-4483.
Kasavajjula, U. et al. Nano- and bulk-silicon-based insertion nodes for lithium-ion secondary cells. Journal of Power Sources 163,1003-1039 (2007).
L. Y. Beaulieu, et al, "Colossal Reversible Volume Changes in Lithium Alloys," Electrochemical and Solid-State Letters, 4 (9) A137-A140 (2001).
Mino Green, et al, "Structured Silicon Anodes for Lithium Battery Applications," Electrochemical and Solid-State Letters, 6 (5) A75-A79 (2003).
N. Pradeep, et al., "Ductility at the nanoscale: Deformation and fracture of adhesive contacts using atomic force microscopy," Applied Physics Letters 91, 203114 (2007).
Nam-Soon Choi, et al, "Effect of fluoroethylene carbonate additive on interfacial properties of silicon thin-film electrode," Journal of Power Sources 161 (2006) 1254-1259.
Ryu, et al., "Electrochemical Behaviors of Silicon Electrode in Lithium Salt Solution Containing Alkoxy Silane Additives", Journal of the Electrochemical Society, vol. 155 (8) pp. A583-A589 (2008).
W.M. Mook, et al, "Compressive stress effects on nanoparticle modulus and fracture," Physical Review B 75, 214112 (2007).
W.W. Gerberich, et al, "Nanoprobing fracture length scales," International Journal of Fracture (2006) 138:75-100.
W.W. Gerberich, et al, "Superhard silicon nanospheres," Journal of the Mechanics and Physics of Solids 51 (2003)—992.
William W. Gerberich, et al, "Reverse plasticity in single crystal silicon nanospheres," International Journal of Plasticity 21 (2005) 2391-2405.

(56) References Cited

OTHER PUBLICATIONS

X. K. Xi, et al, "Fracture of Brittle Metallic Glasses: Brittleness or Plasticity," PRL 94,125510 (2005).
Notice of allowance dated Mar. 5, 2015 for U.S. Appl. No. 13/056,745.
Office action dated Jun. 12, 2014 for U.S. Appl. No. 13/056,745.
Office action dated Dec. 17, 2014 for U.S. Appl. No. 13/056,745.
United States Patent Office Action for U.S. Appl. No. 14/699,000 dated May 16, 2017 (13 pages).

* cited by examiner

HIGH CAPACITY CATHODE

CROSS-REFERENCE TO RELATED APPLICATIONS

This application is a continuation-in-part of U.S. patent application Ser. No. 13/056,745, filed Jan. 31, 2011, which claims priority to International Patent Application No. PCT/US2009/052511, filed Jul. 31, 2009, which claims priority to U.S. Provisional Patent Application No. 61/085,790, filed Aug. 1, 2008, each of which is entirely incorporated herein by reference.

BACKGROUND OF THE INVENTION

Field of the Invention

This invention relates generally to electrodes for batteries, and, more specifically, to high capacity nanostructured anodes or cathodes for lithium batteries.

There has been much interest in lithium batteries as they have the highest specific energy (up to 180 Wh/kg) and energy density (up to 550 Wh/L) among chemical and electrochemical energy storage systems. Currently, lithium ion batteries are used for portable electronics, such as laptops and cell phones. There may also be use for lithium ion batteries in transportation systems, such as bicycles or automobiles.

Graphitic carbon has been the negative electrode material of choice for conventional Li-ion batteries. Graphitic carbon is distinguished by its stable cycle properties and its very high safety. In a conventional Li-ion cell, the anode is made from graphitic carbon, the cathode is a metal oxide, and the electrolyte is a lithium salt in an organic solvent. The typical cathode half reaction is:

The anode half reaction is:

The graphitic intercalation anode allows Li ions to intercalate and de-intercalate reversibly at relatively low potentials (0-0.3 V) with respect to Li/Li$^+$. At such low potentials, the organic electrolyte is reductively unstable, but in the first few cycles it undergoes a surface reaction with the graphite and with impurities and/or electrolyte to form a so-called solid electrolyte interface (SEI) layer on the graphitic surface. The SEI layer is ionically conductive and allows transfer of ions between the electrolyte and the underlying graphite. The SEI also protects against further reduction of the electrolyte.

Graphitic carbon in a negative electrode undergoes a relatively small (compared to pure Li metal) volume change (<40%) during the insertion/extraction of lithium, i.e., the electrode remains stable over multiple cycles. However, graphitic carbon's very low potential (about 100-200 mV) relative to Li/Li$^+$ is disadvantageous. A further drawback to graphitic carbon is its relatively low charge capacity (about 372 mAh/g or 818 Ah/L of graphite), which is only about one tenth the theoretical electrochemical charge capacity achievable with lithium metal (3862 mAh/g and 2047 Ah/L of lithium).

Lithium can form well-defined intermetallic/intercalation phases (Li$_x$M) with numerous metals M (M=Al, Si, Ge, Sn, Pb, Sb, Mg, etc.), their alloys (Si—Sn, Cu—Sn, Sb—Sn, etc.) and with metal oxides (SnO$_2$, etc.) at fairly low potentials with respect to Li/Li$^+$ at room temperature. In general the reversible "lithiation" reaction can be written as:

In an effort to make lithium-ion batteries with high specific energy, these materials have been investigated as promising negative electrode (anode) materials. In particular, silicon-based alloys with high theoretical specific capacity (e.g., nearly 4200 mAh g$^{-1}$ for Li$_{22}$Si$_5$) have been studied extensively as a replacement for graphite. Yet battery cells that use M-lithium alloys as active anode material have not been able to maintain their high capacity on prolonged cycling.

Upon lithium insertion and extraction, many of these metals and their alloys undergo significant changes in volume, ranging from more than 200% to even as much as 400% in some cases. Thus repeated charge/discharge cycles often result in cracking of active material and/or electrolyte binder and the resulting loss of electrical conduction paths.

In U.S. Patent Application Publication 2007/0202403, published Aug. 30, 2007, Oh et al. describe using a nanocomposite binder made of carbon nanotubes in a photo- or thermo-polymerizable material with silicon- or tin-based anode active material particles as an anode in a lithium battery. They state that such a binder enables stable maintenance of adhesion between the anode active material particles as they undergo significant volume changes during charge/discharge battery cycles, thereby preventing volume changes during cycling. Yet if it were possible to prevent expansion of the anode active material particles, it would not be possible for the lithium ions to insert themselves into the particles; it would not be possible to charge the battery. A liquid or solid electrolyte is used in the anode. If the anode active material particles do expand, no teaching is given as to how the extra volume would be accommodated.

In U.S. Patent Application Publication 2008/0044732, published Feb. 21, 2008, Salot et al. describe an anode for a lithium battery that has silicon nanowires extending from a current-collecting substrate. A solid electrolyte rests on the free ends of the nanowires creating closed cavities between the nanowires. Care is taken to be sure that the cavities are large enough to accommodate expansion of the nanowires during lithium insertion. Although this may solve some of the problems discussed above, this arrangement offers a very small contact area, only at the nanowires ends between the electrolyte and the anode active material, thus making sacrifices in battery rate performance.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of electrodes in a lithium battery. The skilled artisan will readily appreciate, however, that the materials and methods disclosed herein will have application in a number of other contexts where ion insertion into anode materials is desirable, particularly where accommodation of volume change is important.

In accordance with an aspect of the present invention, the need described above can be met with a novel anode or cathode that uses an ionically-conductive solid polymer material as both binder and electrolyte in combination with high-capacity anode or cathode active material particles. A solid polymer electrolyte comprises a polymer and at least one salt. The solid polymer electrolyte material has material properties that allow it to stretch and a configuration that allows it to contract as the active material particles swell and shrink with insertion and extraction of lithium. The solid polymer electrolyte is able to transfer the increased volume to voids within the anode or cathode and to retain adhesion with the active material particles, even as they undergo significant volume changes during charge/discharge cycles of the battery.

In accordance with another aspect of the invention, a lithium secondary battery that employs the novel anode or cathode is provided.

These and other objects and advantages of the present invention will become more fully apparent from the following description taken in conjunction with the accompanying drawings.

In this disclosure, the terms "negative electrode" and "anode" are both used to mean "negative electrode". Likewise, the terms "positive electrode" and "cathode" are both used to mean "positive electrode".

The term "solid polymer" is used herein to mean solid and semi solid (gel) materials that can support and maintain a porous void structure. Pores are compressible.

The term "nanostructure" is used herein to mean a structure that has at least two dimensions in the nanometer range. An exemplary nanostructure can be approximately equiaxed, such as a nanoparticle or nanosphere; or it can be linear, such as a nanorod, nanofiber, nanotube, or nanowire.

In some arrangements, approximately equiaxed nanostructures have a diameter between about 5 nm and 1 μm. In some arrangements, approximately equiaxed nanostructures have a diameter between about 5 nm and 500 nm. In some arrangements, approximately equiaxed nanostructures have a diameter between about 5 nm and 100 nm. In some arrangements, approximately equiaxed nanostructures have a diameter between about 5 nm and 50 nm.

In some arrangements, linear nanostructures have a diameter between about 1 nm and 1 μm. In some arrangements, linear nanostructures have a diameter between about 1 nm and 500 nm. In some arrangements, linear nanostructures have a diameter between about 1 nm and 100 nm.

In some arrangements, the cathode contains a plurality of voids, and the plurality of voids has a total volume no smaller than four times the total volume of the nanostructures before lithiation. In some arrangements, the plurality of voids has a total volume no smaller than three times the total volume of the nanostructures before lithiation. In some arrangements, the plurality of voids has a total volume no smaller than two and a half times the total volume of the nanostructures before lithiation. In some arrangements, the plurality of voids has a total volume no smaller than twice the total volume of the nanostructures before lithiation. In yet other arrangements, the plurality of voids has a volume that is between about 10% and 60% of the electrode.

In one arrangement, the cathode comprises between about 0 and 10 weight percent conductive carbon particles. Examples of appropriate carbon particle materials include, but are not limited to, any one or more of acetylene black, vapor grown carbon fiber, graphite, or mixtures thereof.

The embodiments of the invention are described using the example of silicon as the nanostructured active anode material. The embodiments of the invention are also described using the example of sulfur and vanadium pentoxide ($V_2O_5$) as the nanostructured active cathode material. It should be understood that the embodiments of the invention can also find utility when other compounds, metals, alloys, or metal oxides, which can form well-defined intermetallic/intercalation phases with lithium, are used. Examples of appropriate nanostructure material include, but are not limited to, any one or more of metals such as, aluminum (Al), germanium (Ge), tin (Sn), lead (Pb), antimony (Sb), magnesium (Mg), copper, nickel or alloys or mixtures thereof; Si alloys with elements such as tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr); silicon oxides and carbides; alloys such as Cu—Sn, Sb—Sn; and metal oxides such as $SnO_2$. Examples of appropriate nanostructure material also include compounds such as, $FeS_2$, $FeOF$, $FeF_3$, $FeF_2$, $MoO_3$, sulfur, lithium polysulfides, $CuO$, $Cu_2O$, $FeO$, $Fe_2O_3$, $V_6O_{13}$, $VO_2$, $Li_{1+x}V_3O_8$ ($0 \leq x \leq 3$), $Ag_xV_2O_5$ ($0 < x \leq 2$), $Cu_xV_4O_{11}$ ($0 < x \leq 3$), $VOPO_4$, $LiCoO_2$, lithium iron phosphate (LFP), nickel-cobalt manganese (NCM), nickel cobalt aluminum (NCA), or mixtures thereof.

Lithium is stored in an anode host material in ionic, not atomic, form. Thus, the lithium packing densities within the alloys also reflect the theoretical charge capacities of the alloys. Table 1 shows the lithium volumetric packing density in unalloyed, metallic lithium, as well as in a few lithium alloys of interest:

TABLE 1

| Material | Lithium Packing Density (mol $L^{-1}$) |
| --- | --- |
| Metallic Li | 76.36 |
| $Li_{22}Si_5$ | 88.56 |

TABLE 1-continued

| Material | Lithium Packing Density (mol L$^{-1}$) |
|---|---|
| Li$_{22}$Sn$_5$ | 75.47 |
| Li$_{22}$Pb$_5$ | 72.17 |

The Li packing densities in the alloys shown in Table 1 are close to the Li packing density in lithium metal. In one case, Li$_{22}$Si$_5$, the Li packing density is even higher than it is in metallic lithium. The cycling efficiency of lithium metal is only about 99%, so that even after just 100 cycles, the amount of lithium available to the battery falls to 36%. Thus it is customary to provide as much as three to four times excess lithium to prolong cell life.

Some data suggest that lithium alloy electrodes may have higher lithium alloy cycling efficiencies than do lithium metal electrodes. In that case, there would be less need to add excess active material to the electrode. Thus, lithium alloy electrodes may be able to provide even more useful lithium in a smaller volume than indicated by the lithium packing densities shown in Table 1. Volumetric energy density is especially important in consumer electronics, where battery volume can be critical. Anode materials based on lithium alloys also have the advantage that lithium dendrite formation during cell charging does not occur as it does with metallic lithium anodes. Thus, these lithiated alloys are very interesting candidates for the next generation of lithium battery anodes.

One problem with using high capacity electrode active materials as active anode material in conventional electrode is the large volume expansion they experience with lithium insertion (i.e., during cell charging or discharging). The volume increase can be more than 200% and even as large as 400% in some cases. As a cell discharges, lithium is extracted from the anode active material, and the anode material shrinks. As a cell charges, lithium is extracted from the cathode active material, and the cathode material shrinks Thus, as the cell is cycled, the electrode active material experiences repeated expansion and contraction. In conventional electrodes, active material particles are held together with a rigid binder, such as PVDF (polyvinylidene fluoride), to form an open network or matrix that can be filled with liquid electrolyte. It is important to fill the network with as much liquid electrolyte as possible in order to maximize the active material/electrolyte contact area. But, such a structure is incompressible and cannot accommodate any changes in active material volume. Thus, the active material particles and the binder holding them in place experience very large stresses during cycling. This has led to three undesirable outcomes: disintegration of the electrode active material particles, exfoliation of the polymeric binder at the particle surfaces, and breaking up of the binder that holds the electrode together.

In general, active host materials undergoing large volume expansion and contraction, either in the anode or cathode, can break into fragments after a few cycles of lithium insertion and extraction due to the stressed induced by large volume changes that occur during these processes. The fragments can be isolated and may no longer be able to participate in the electrochemical reactions of the anode or cathode. In addition, as the particles expand, stress is transmitted from the particles to the binder matrix. Such stress can cause non-reversible plastic failure in the binder, leading to loss of overall anode or cathode film integrity.

Figure 1A:
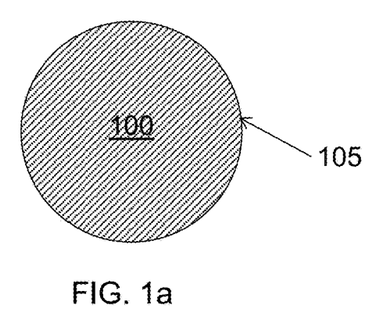
FIGS. 1a-1c are schematic cross-section illustrations of a particle of anode or cathode active material as it undergoes lithium insertion.
Figure 1B:
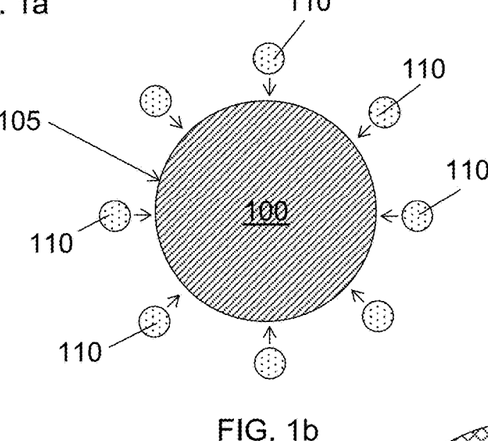
Figure 1C:
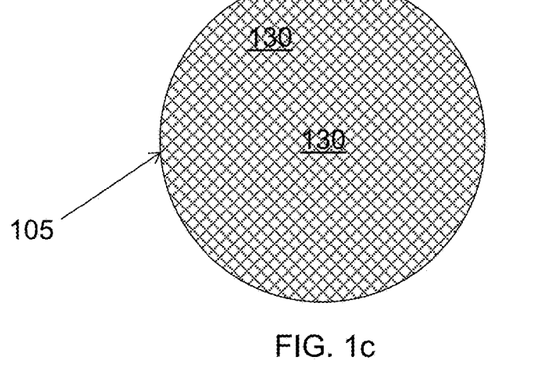

As a cell is charged, lithium penetrates small active anode material particles within the anode. FIG. 1a shows one such anode active material particle 100 before charging. The particle 100 has an outside surface 105. In an exemplary embodiment, the particle 100 is silicon. In FIG. 1b, Li$^+$ ions 110 are about to penetrate through the surface 105 to lithiate the particle 100. FIG. 1c shows the particle 100 at some time after lithiation has begun. Li$^+$ ions have penetrated the surface 105 and diffused into the particle 100, inserting themselves into the silicon matrix to form a series of Si—Li mixtures or phases 130. The original unlithiated silicon particle 100 occupies a much smaller volume than any of the continuously-forming Si—Li mixtures or phases 130. In general, the volume increase is a function of the Li$^+$ concentration. At full Li$^+$ capacity, the volume increase can be as much as 400%.

As a cell is discharged, lithium penetrates small active cathode material particles within the cathode. FIG. 1a can also show one such cathode active material particle 100 before discharging. The particle 100 has an outside surface 105. In an exemplary embodiment, the particle 100 is vanadium pentoxide. In FIG. 1b, Li$^+$ ions 110 are about to penetrate through the surface 105 to lithiate the particle 100. FIG. 1c shows the particle 100 at some time after lithiation has begun. Li$^+$ ions have penetrated the surface 105 and diffused into the particle 100, inserting themselves into the V$_2$O$_5$ matrix to form Li$_x$V$_2$O$_5$ (0≤x≤3) phases 130. The original unlithiated V$_2$O$_5$ particle 100 occupies a much smaller volume than any of the continuously-forming lithiated mixtures or phases 130. The volume increase is a function of the Li$^+$ concentration. At full Li$^+$ capacity, the volume increase can be greater than 20%.

Figure 2A:
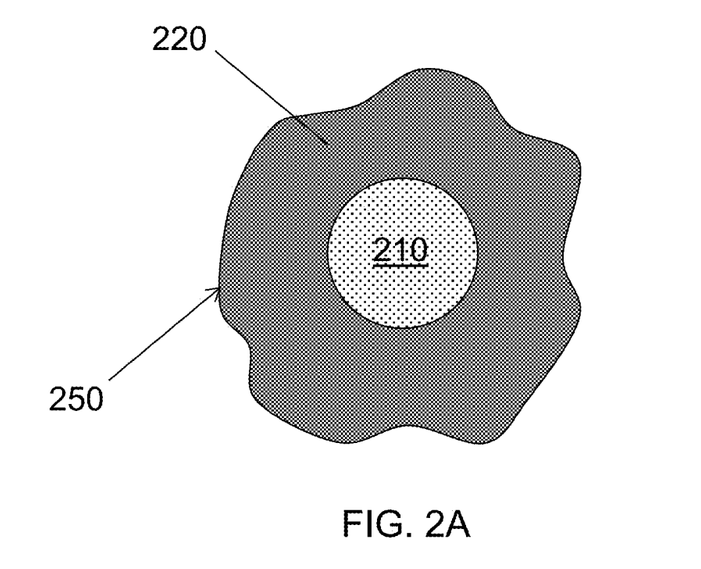
FIGS. 2A and B are schematic cross-section illustrations of an active material nanoparticle embedded in an electrode as it undergoes lithiation.

FIG. 2A is a schematic cross-section illustration of a silicon nanoparticle 210 in a typical anode, or a V$_2$O$_5$ nanoparticle 210 in a typical cathode. At first, the active material nanoparticle 210 contains little or no lithium. The nanoparticle 210 is surrounded by a non-compressible environment 220, made up of some combination of binder, liquid electrolyte, and, optionally, conductive carbon particles such as carbon black. For ease of illustration, no distinction has been made among the various components of the non-compressible environment 220. Of course, an anode or cathode contains very many nanoparticles dispersed within the binder and electrolyte. The entire battery, and, by extension, the anode or cathode, is enclosed ultimately by its packaging, which forms a rigid boundary for the entire battery volume. For the purpose of this illustration, the local environment 220 is shown to end at a rigid boundary indicated by line 250, to represent the environment experienced by the nanoparticle 210.

Figure 2B:
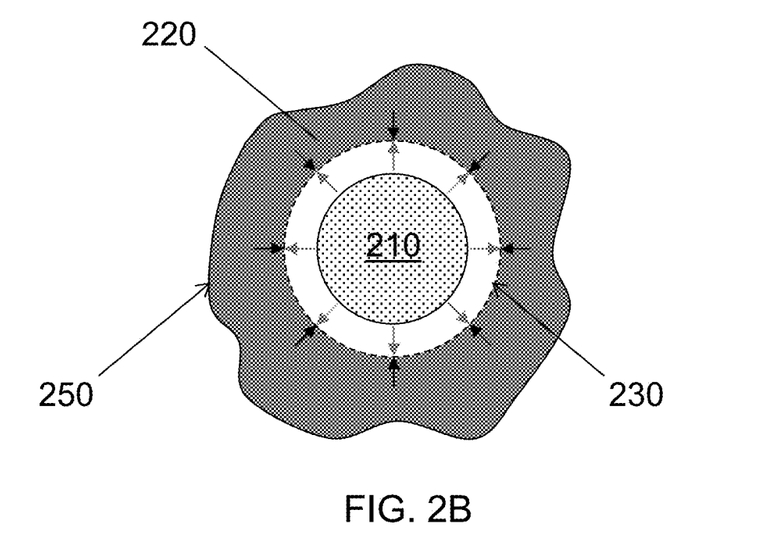

In FIG. 2B, nanoparticle 210 shows an silicon nanoparticle for an anode, or a V$_2$O$_5$ nanoparticle for a cathode. Lithium insertion into the nanoparticle 210 causes the nanoparticle to swell to a larger size as indicated by the dashed line 230. Gray arrows show the direction of expansion of the nanoparticle 210. The non-compressible and rigidly bound environment 220 cannot accommodate the increasing size of the nanoparticle 210 and pushes back with an equal and opposite force, as indicated by the black arrows.

The stress caused by this process can cause the nanoparticle 210 and/or binder in the environment 220 to crack. If the nanoparticle 210 breaks apart, there is irreversible capacity loss; there is lithium tied up in the broken silicon or V$_2$O$_5$, and that lithium can no longer cycle between the positive and negative electrodes. Furthermore, there is less total active material available to receive cycling lithium, as portions of the broken silicon or V$_2$O$_5$ are no longer actively connected to the ionic percolation network within the electrode. If there is no free volume for accommodating the expansion of the silicon or $V_2O_5$ nanoparticle, the surrounding binder/active material/carbon composite 220 may undergo non-reversible deformation as the stress increases beyond the yield stress of the composite, resulting in loss of mechanical integrity of the anode or cathode film.

There have been a number of studies done to determine the fracture properties of nanoparticles. When a particle is larger than its critical fracture length, a fracture can move through the particle. The critical fracture length is determined by material properties; it is directly proportional to the square of the fracture toughness, and inversely proportional to the square of the yield stress. For materials that undergo brittle failures (ceramics, glasses etc.), fracture occurs through nucleation of cracks and their subsequent propagation along dislocations. Dislocations, however, are statistical in nature; reducing the size of a particle also reduces the number of dislocations it can contain. Dislocations are extremely rare in nanocrystals, e.g., crystalline particles that are smaller than about 20 nm. By making active material particles very small, smaller than the critical fracture length, the probability of fracture can be reduced. This suggests that various useful nanostructured geometries, such as nanorods, nanowires, nanotubes, nanoparticles can be used to mitigate disintegration of anode active materials. The idea of using nano-sized intercalation hosts to prevent fracturing of the host materials has been demonstrated by several researchers. See for example, Gao, B., Sinha, S., Fleming, L. & Zhou, O., *Adv. Mater.* 13, 816-819 (2001) or Kasavajjula, U. et al. *Journal of Power Sources* 163, 1003-1039 (2007), which is included by reference herein.

Among nanostructured anode or cathode materials, linear structures have received considerable attention because they seem to provide improved stress distribution and percolation for electronic transport. Nevertheless, even when anode or cathode active material particles do not crack, there has not yet been a good way for an anode or cathode to accommodate the volume increase of the particles upon lithium insertion. The overall failure of anode or cathode films because of stress transfer between the particles and the binder material is a more difficult problem to solve. As has been discussed above, a rigid binder matrix filled with either a liquid or solid electrolyte is incompressible and prone to cracking as a result of the stress.

Another problem that limits the use of metallic and intermetallic anode or high volume change cathode host material particles is that during cycling, a stable solid electrolyte interface (SEI) protective layer is not known to form on the particle surfaces. Using nanoparticle-sized active material inherently exposes a large active surface area, which in turn means a large overall rate of electrolyte reduction or oxidation at the surface in the absence of a protective layer on the anode or cathode particles. As discussed above for graphitic anodes, organic electrolytes undergo a surface reaction with the graphite particles during the first few charge/discharge cycles, thus forming an SEI layer on the graphitic surfaces. Although the SEI layer removes some amount of lithium from electrochemical cycling, it also protects against further reduction of the electrolyte and further loss of lithium. Even if a somewhat stable SEI layer can be formed on high capacity anode or cathode particles during the first few cycles, as the particles expand and contract, the SEI layer would crack, exposing fresh surfaces that are available for continued electrolyte reduction or oxidation reactions and removal of additional lithium from cycling. Hence, high capacity anodes or cathodes exhibit continual, irreversible capacity loss, canceling out the advantages that are expected from materials with such high theoretical capacities.

Figures 3A, 3B:
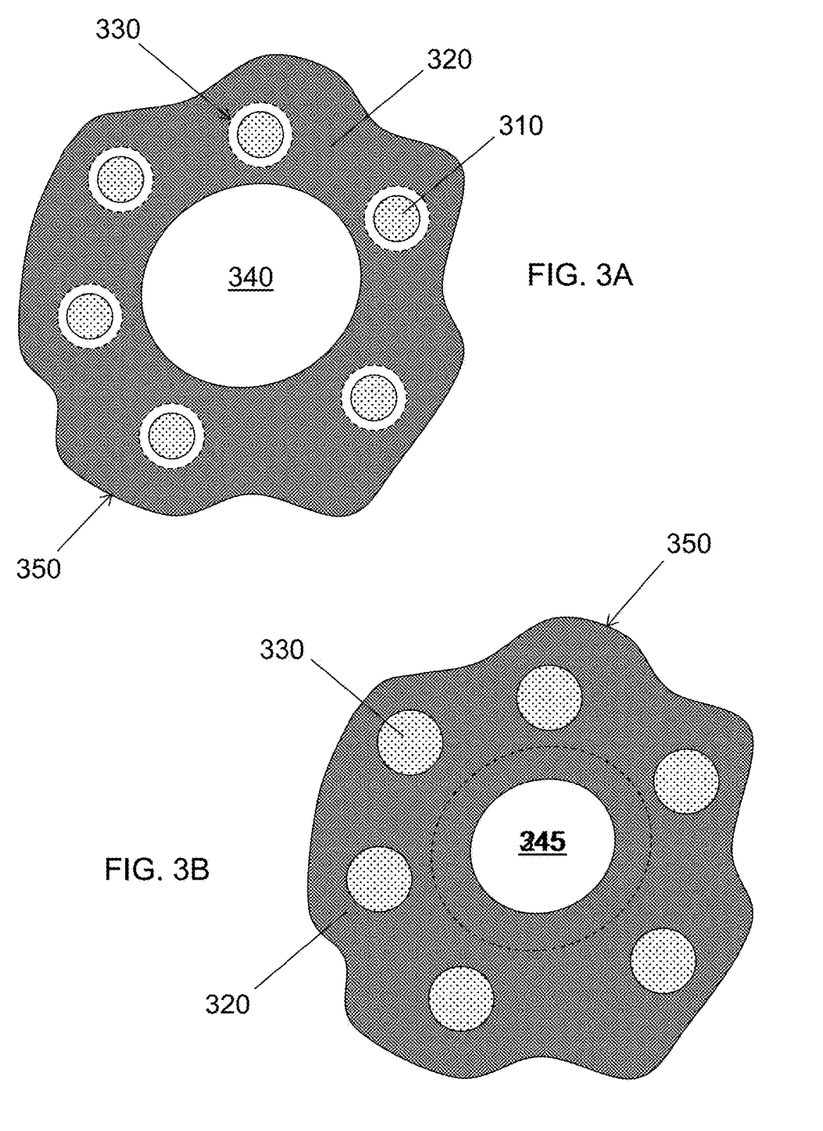
FIGS. 3A and 3B show schematic cross section illustrations of alloy nanoparticles embedded in a solid polymer electrolyte before (A) and after (B) insertion of lithium.

In FIG. 3A, nanoparticles 310 show silicon nanoparticles for an anode, or $V_2O_5$ nanoparticles for a cathode. FIG. 3A shows nanoparticles 310 surrounded by a solid polymer electrolyte 320 which provides a conductive path for ions to reach the nanoparticles 310 in an anode or a cathode, according to an embodiment of the invention. The solid electrolyte 320 also acts as a binder, holding the nanoparticles in well-dispersed positions. In one embodiment of the invention, no additional binder material is used, thereby significantly reducing or eliminating the f inactive material in the electrode. In another embodiment of the invention, additional binder material, such as PVDF (polyvinylidene-fluoride) (not shown), is used to ensure that the nanoparticles 310 are fixed in a well-dispersed arrangement. The solid electrolyte 320 also contains voids, one of which 340 is shown in FIG. 3A. In some arrangements, the electrolyte 320 also contains conductive carbon particles such as carbon black (not shown) to provide electronic conductivity. In some arrangements, no carbon black is used because the electrode already has sufficient electronic conductivity. As discussed above for FIG. 2, a rigid boundary 350 is shown around the solid polymer electrolyte 320 for ease of illustration. At first, nanoparticles 310 contain little or no lithium. As lithium penetrates into the nanoparticles 310, the nanoparticles swell to larger sizes as indicated by the dashed lines 330. The solid electrolyte 320 has sufficient elasticity that it can deform reversibly in response to expansion of the nanoparticles 310. But, of course, the solid electrolyte 320 is incompressible. If there were no void 340 within the boundary 350, there would be no space to which the electrolyte 320 could move, and the electrolyte 320 would push back on the particles 310, causing stress and cracking in the particles 310 and/or the solid electrolyte 320, as has been discussed above in FIG. 2.

In the embodiment of the invention shown in FIGS. 3A and 3B, the void 340 in the electrolyte 320 is compressible. As the nanoparticles 310 incorporate Li ions and swell, the electrolyte 320 maintains contact with the nanoparticles 310 as it transfers the volume expansion to the void 340. As shown in FIG. 3B, fully-lithiated active material nanoparticles have swollen to their largest size 330, and the void 340 has shrunk to a smaller size 345 without breaching the rigid boundary 350. When the nanoparticles 310 release the Li ions, their volume decreases. The solid electrolyte 320, in turn, pulls away from the void 345, increasing the volume of the void 345. The solid electrolyte 320 has good adhesion to the nanoparticles 310 and thus maintains good contact with the surfaces of the nanoparticles 310 as the nanoparticles 310 contract. Thus the void 340/345 enables the anode or cathode to accommodate the changes in the volume of the nanoparticles 310/330 as lithium is inserted into and extracted from the nanoparticles 310/330.

Figure 4A:
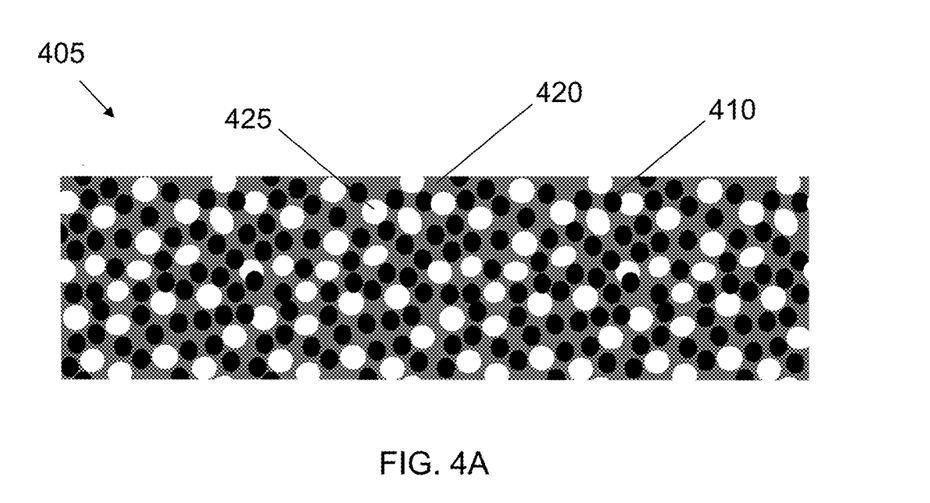
FIGS. 4A and B show schematic cross section illustrations of novel electrodes whose active material is in the form of (A) nanoparticles and (B) linear nanostructures.

FIG. 4A shows a portion of a novel electrode 405, according to an embodiment of the invention. The electrode 405 contains nanoparticles 410 embedded in a solid polymer electrolyte 420. The nanoparticles 410 show silicon nanoparticles for if the electrode 405 is an anode, or $V_2O_5$ nanoparticles if the electrode 405 is a cathode. Voids 425 are dispersed throughout the electrolyte 420. The electrode 405 may also contain other components that are not shown in FIG. 4A. In one arrangement, additional binder material, such as PVDF, is used to ensure that the nanoparticles 410 are fixed in a well-dispersed arrangement. In one arrangement, there are electronically conductive carbon particles dispersed in the electrolyte 420. In another arrangement, there is a current collector adjacent the electrode 405. Upon charging of a lithium cell with an anode 405, the silicon nanoparticles 410 expand as they take up lithium ions. Upon discharging of a lithium cell with a cathode 405, the $V_2O_5$ nanoparticles 410 expand as they take up lithium ions. As discussed above, the surrounding electrolyte 420 can deform reversibly in response to the expansion of the nanoparticles and transfer the volume expansion to the voids 425. In some arrangements, more than one electrolyte can be used in the electrode 405.

Figure 4B:
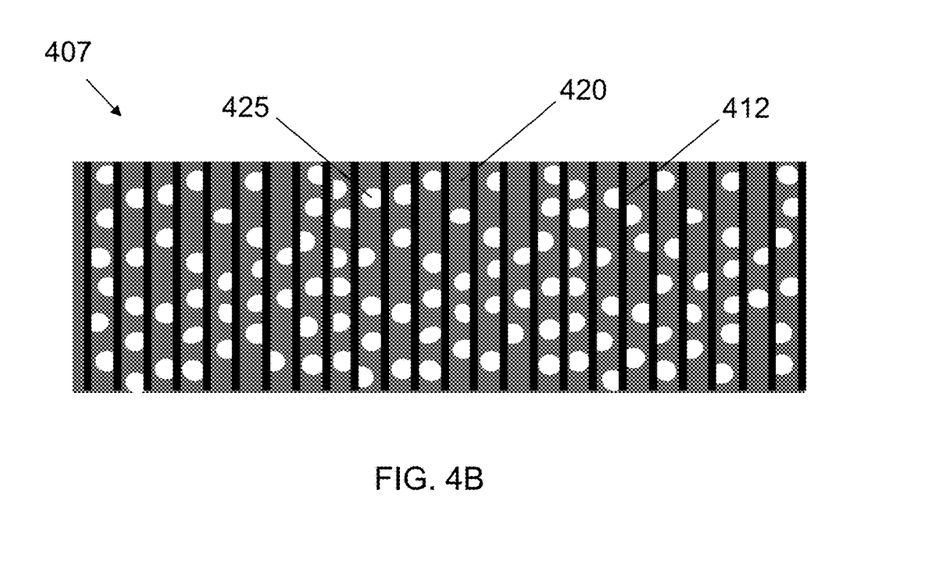

FIG. 4B shows a portion of a novel electrode 407, according to an embodiment of the invention. The electrode 407 shows an anode or cathode that contains linear nanostructure 412. In an anode, the nanostructure 412 can be silicon nanowires embedded in a polymer electrolyte 420. In a cathode, the nanostructure 412 can be active material nanowires, embedded in a polymer electrolyte 420. Although the linear nanostructures 412 are shown aligned, it should be understood that they can take on other ordered or disordered arrangements. Voids 425 are dispersed throughout the electrolyte 420. The electrode 407 may also contain other components that are not shown in FIG. 4B. In one arrangement, additional binder material, such as PVDF, is used to ensure that the linear nanostructures 412 are fixed in a well-dispersed arrangement. In one arrangement, there are electronically conductive carbon particles dispersed in the electrolyte 420. In another arrangement, there is a current collector adjacent the electrode 407. Upon charging of a lithium cell with such an anode 407, the silicon nanowires 412 expand as they take up lithium ions. Upon discharging of a lithium cell with such a cathode 407, the nanowires 412 expand as they take up lithium ions. As discussed above, the surrounding electrolyte 420 can deform reversibly in response to the expansion of the nanowires and transfer the volume expansion to the voids 425. In some arrangements, more than one electrolyte can be used in the electrode 407.

It should be noted that although conventional electrodes are often made as open networks of active material, binder, and conductive carbon particles such as carbon black, they are inactive and contain no electrolyte until the open space in the networks is filled with liquid electrolyte. Only after the liquid electrolyte is added, is it possible for the electrodes to receive and release lithium ions and thus function as an electrochemical device. Such electrodes are not designed to retain voids after the electrolyte is added. Rather, care is taken to ensure that there are no voids after the electrolyte is added, as any void space would create a region where there is no electrolyte in contact with active material, thereby reducing the capacity of the device, a highly undesirable outcome. Also, voids or "free volume" cannot be maintained when a liquid electrolyte is used, as liquids cannot retain a porous structure.

Anode or cathode layers made from active material particles, solid electrolyte, and optional (carbon) electronically conductive particles can be made in a few different ways to create anode or cathode layers with voids according to embodiments of the invention. One such method is solvent casting and another is extrusion.

In solvent casting, active material particles, solid polymer electrolyte, and optional (carbon) electronically conductive particles are mixed together with a solvent that dissolves the polymer to form a slurry. The slurry contains a suspension of active material particles in the polymer solution. The slurry is deposited (e.g., poured) onto a substrate and allowed to dry. As the mixture dries, solvent leaves, and voids form in the polymer electrolyte. The size and distribution of the voids depend on a few factors such as the mechanical properties of the polymer and the dilution of the polymer. The more dilute the polymer (i.e., the higher the ratio of solvent to polymer), the higher the proportion of void space that can be created. The more tough the polymer, the better the polymer can retain the void structure without collapsing in on itself. Another factor that can influence the void structure in the polymer electrolyte is the size and size distribution of the active material (and optional conductive) particles. In some arrangements, foaming agents or surfactants can be added to the slurry to facilitate void formation.

In extrusion, a mixture of active material particles, polymer electrolyte, and optional (carbon) electronically conductive particles are fed into an extruder. The temperature of the extrusion is chosen above the melting temperature/glass transition temperature of the mixture. As the mixture is fed into the extruder, and the polymer melts in the extruder, an inert gas, such as argon, is added to make voids in the extruded anode or cathode. Again, the more tough the polymer, the better the polymer can retain the void structure without collapsing in on itself. In some arrangements, foaming agents or surfactants can be added to the slurry to facilitate void formation. This method is also known as foam extrusion.

Figure 5:
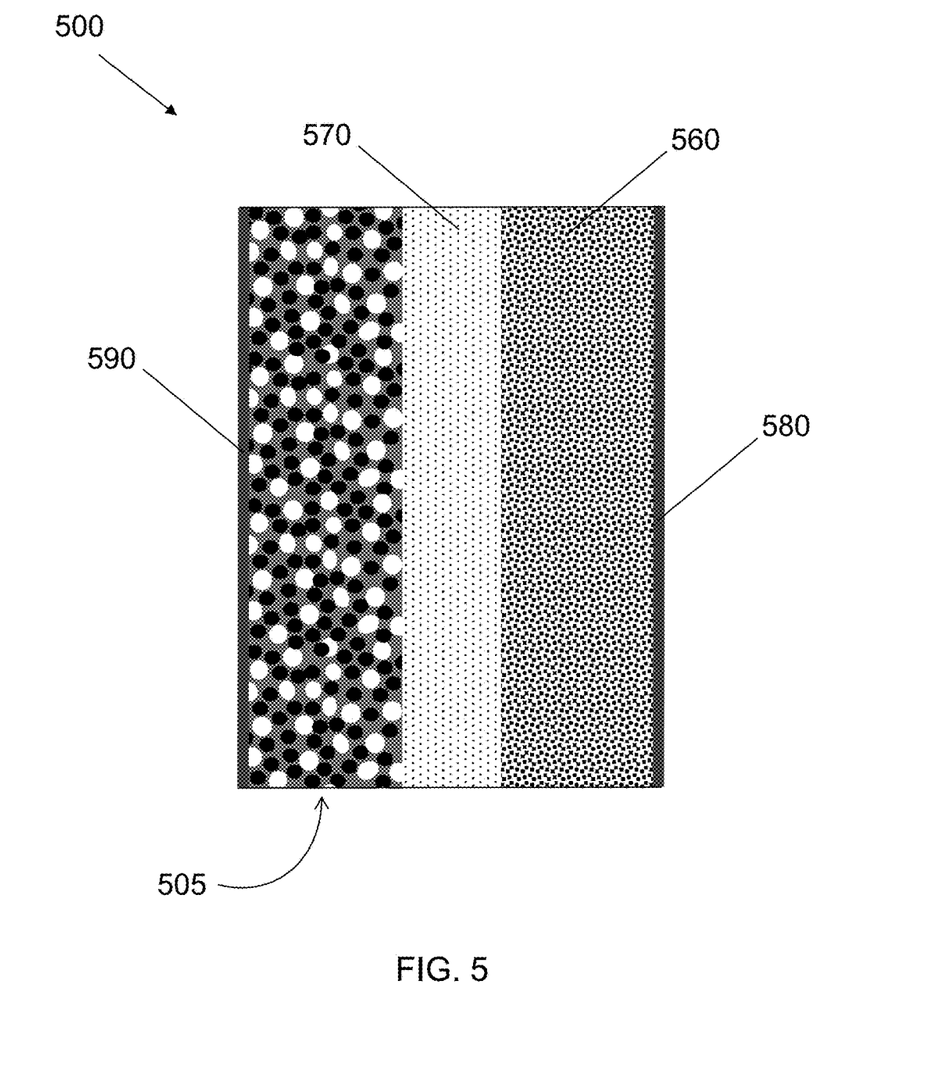
FIG. 5 is a schematic cross-section illustration of a battery cell with a novel electrode, according to an embodiment of the invention.

FIG. 5 is a schematic cross-section illustration of a battery cell 500 with a novel electrode 505, according to an embodiment of the invention. In some cases, the battery cell 500 in FIG. 5 can contain a negative electrode 505. The negative electrode 505 is as has been described above in any of the embodiments of the invention. The cell 500 also has a positive electrode 560. There is an electrolyte layer 570 between the negative electrode 505 and the positive electrode 560. In some arrangements, there can be a current collector 580 adjacent the positive electrode 560 and/or a current collector 590 adjacent the negative electrode 505. In some other cases, the battery cell 500 in FIG. 5 can contain a positive electrode 505. The cathode 505 is as has been described above in any of the embodiments of the invention. The cell 500 also has a negative electrode 560. There is an electrolyte layer 570 between the positive electrode 505 and the negative electrode 560. In some arrangements, there can be a current collector 580 adjacent the negative electrode 560 and/or a current collector 590 adjacent the positive electrode 505.

There are a variety of materials that are suitable for use as solid polymer electrolyte binders in the novel electrode as described above. In general, any polymer electrolyte that is solid or semi-solid at cell operating temperatures, has good ionic conductivity, has sufficient elasticity that it can deform reversibly and can adhere to anode or cathode active material particles can be used.

The electrochemical stability of the electrolyte in the anode or cathode in relation to the active anode or cathode material is very important as side reactions can remove both active anode or cathode material and lithium from active participation in the electrochemistry of the cell and thus result in capacity fade for the cell. In general, solid polymer electrolytes are more stable compared to liquid electrolytes.

In one embodiment of the invention, the solid polymer electrolyte used in the anode or cathode or in any other part of the cell can be polyethylene oxide, a polysulfone, polyacrylonitrile, a siloxane, a polyether, a polyamine, a linear copolymers containing ethers or amines, an ethylene carbonate based polymer, a polysiloxane grafted with small molecules or oligomers that include polyethers and/or alkylcarbonates or any other polymers or combination of polymers that have a high enough ionic conductivity, when mixed with an appropriate salt, to act as an electrolyte in a cell, such as a lithium ion cell. Another example of a suitable solid polymer electrolyte is Nafion®. Polymers that are liquid at battery cell operating temperatures can be made solid through cross-linking, as is well known in the art. Salts provided below or elsewhere herein can also be used with any of these electrolytes.

In another embodiment of the invention, the solid polymer electrolyte can be replaced by a ceramic-based electrolyte, such as lithium phosphorous oxynitride, nascion, lisicon, lithium lanthanum titanium oxide (LLTO), lithium lanthanum zirconium oxide (LLZO), or others know in the field.

In yet another embodiment of the invention, the solid polymer electrolyte in the novel electrode is a block copolymer electrolyte.

Nanostructured Block Copolymer Electrolytes

As described in detail above, a block copolymer electrolyte can be used in the embodiments of the invention.

Figure 6A:
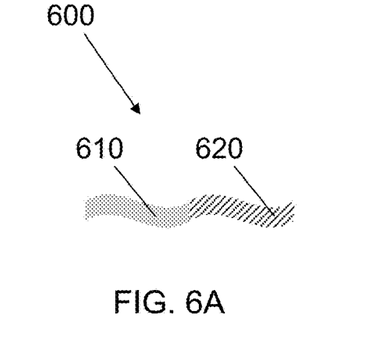
FIGS. 6A, 6B and 6C are schematic drawings of a diblock copolymer and a domain structure it can form.

FIG. 6A is a simplified illustration of an exemplary diblock polymer molecule 600 that has a first polymer block 610 and a second polymer block 620 covalently bonded together. In one arrangement both the first polymer block 610 and the second polymer block 620 are linear polymer blocks. In another arrangement, either one or both polymer blocks 610, 620 has a comb (or branched) structure. In one arrangement, neither polymer block is cross-linked. In another arrangement, one polymer block is cross-linked. In yet another arrangement, both polymer blocks are cross-linked.

Figure 6B:
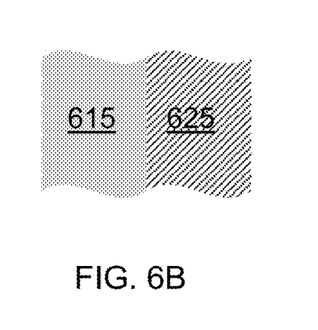
Figure 6C:
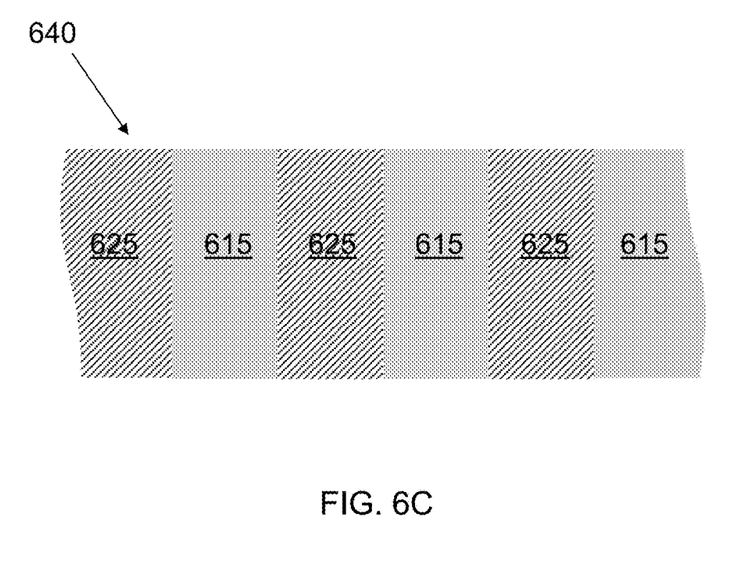

Multiple diblock polymer molecules 600 can arrange themselves to form a first domain 615 of a first phase made of the first polymer blocks 610 and a second domain 625 of a second phase made of the second polymer blocks 620, as shown in FIG. 6B. Diblock polymer molecules 600 can arrange themselves to form multiple repeat domains, thereby forming a continuous nanostructured block copolymer material 640, as shown in FIG. 6C. The sizes or widths of the domains can be adjusted by adjusting the molecular weights of each of the polymer blocks.

In one arrangement the first polymer domain 615 is ionically conductive, and the second polymer domain 625 provides mechanical strength to the nanostructured block copolymer.

Figure 7A:
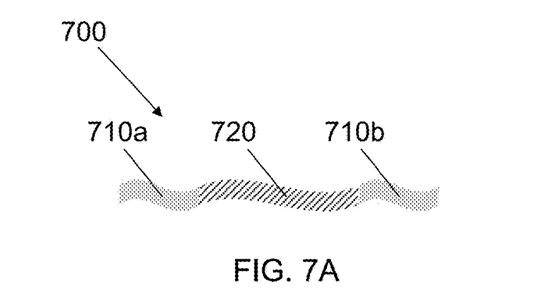
FIGS. 7A, 7B and 7C are schematic drawings of a triblock copolymer and a domain structure it can form.

FIG. 7A is a simplified illustration of an exemplary triblock polymer molecule 700 that has a first polymer block 710a, a second polymer block 720, and a third polymer block 710b that is the same as the first polymer block 710a, all covalently bonded together. In one arrangement the first polymer block 710a, the second polymer block 720, and the third copolymer block 710b are linear polymer blocks. In another arrangement, either some or all polymer blocks 710a, 720, 710b have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 7B:
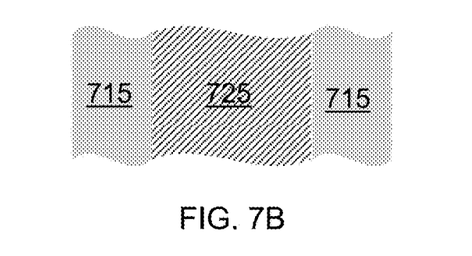
Figure 7C:
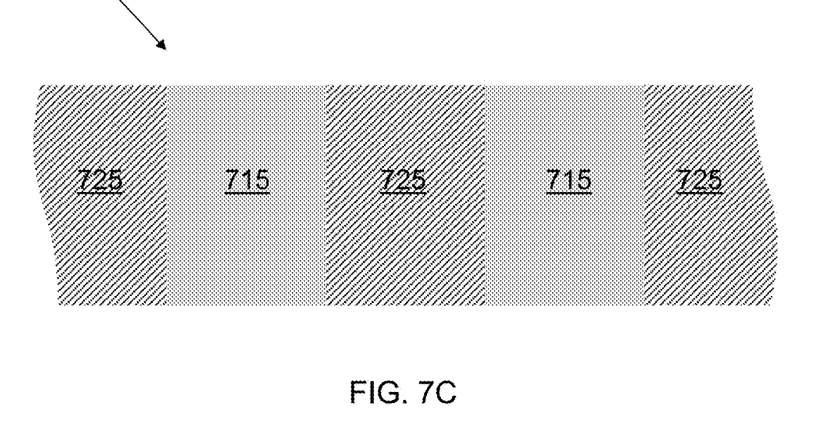

Multiple triblock polymer molecules 700 can arrange themselves to form a first domain 715 of a first phase made of the first polymer blocks 710a, a second domain 725 of a second phase made of the second polymer blocks 720, and a third domain 715 of a first phase made of the third polymer blocks 710b as shown in FIG. 7B. Triblock polymer molecules 700 can arrange themselves to form multiple repeat domains 725, 715 (containing both 710a and 710b), thereby forming a continuous nanostructured block copolymer 740, as shown in FIG. 7C. The sizes of the domains can be adjusted by adjusting the molecular weights of each of the polymer blocks.

In one arrangement the first and third polymer domains 715 are ionically conductive, and the second polymer domain 725 provides mechanical strength to the nanostructured block copolymer. In another arrangement, the second polymer domain 725 is ionically conductive, and the first and third polymer domains 715 provide a structural framework.

Figure 8A:
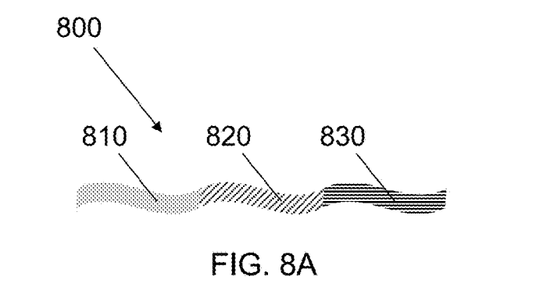
FIGS. 8A, 8B and 8C are schematic drawings of a triblock copolymer and a domain structure it can form.

FIG. 8A is a simplified illustration of another exemplary triblock polymer molecule 800 that has a first polymer block 810, a second polymer block 820, and a third polymer block 830, different from either of the other two polymer blocks, all covalently bonded together. In one arrangement the first polymer block 810, the second polymer block 820, and the third copolymer block 830 are linear polymer blocks. In another arrangement, either some or all polymer blocks 810, 820, 830 have a comb (or branched) structure. In one arrangement, no polymer block is cross-linked. In another arrangement, one polymer block is cross-linked. In yet another arrangement, two polymer blocks are cross-linked. In yet another arrangement, all polymer blocks are cross-linked.

Figure 8B:
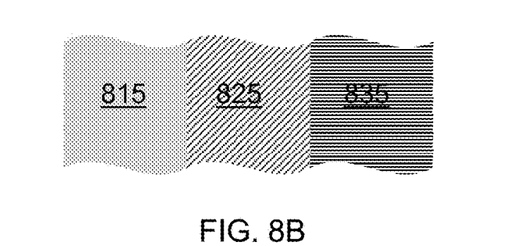
Figure 8C:
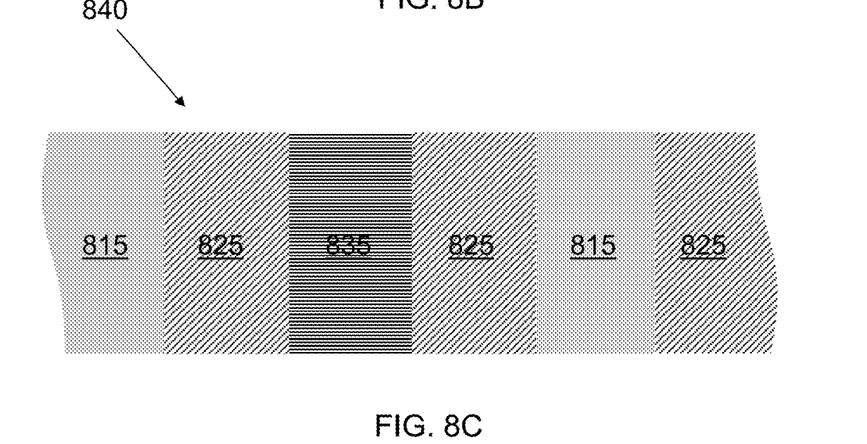

Multiple triblock polymer molecules 800 can arrange themselves to form a first domain 815 of a first phase made of the first polymer blocks 810, a second domain 825 of a second phase made of the second polymer blocks 820, and a third domain 835 of a third phase made of the third polymer blocks 830 as shown in FIG. 8B. Triblock polymer molecules 800 can arrange themselves to form multiple repeat domains, thereby forming a continuous nanostructured block copolymer 840, as shown in FIG. 8C. The sizes of the domains can be adjusted by adjusting the molecular weights of each of the polymer blocks.

In one arrangement the first polymer domains 815 are ionically conductive, and the second polymer domains 825 provide mechanical strength to the nanostructured block copolymer. The third polymer domains 835 provides an additional functionality that may improve mechanical strength, ionic conductivity, chemical or electrochemical stability, may make the material easier to process, or may provide some other desirable property to the block copolymer. In other arrangements, the individual domains can exchange roles.

Choosing appropriate polymers for the block copolymers described above is important in order to achieve desired electrolyte properties. In one embodiment, the conductive polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a an elastic modulus in excess of $1 \times 10^5$ Pa at electrochemical cell operating temperatures. In another embodiment, the structural material has a yield strain of 50%-500% and an elastic modulus in excess of $1 \times 10^5$ Pa at electrochemical cell operating temperatures. In one embodiment, the third polymer (1) is rubbery; and (2) has a glass transition temperature lower than operating and processing temperatures. It is useful if all materials are mutually immiscible.

In one embodiment of the invention, the conductive phase can be made of a linear or branched polymer. Conductive linear or branched polymers that can be used in the conductive phase include, but are not limited to, polyethers, polyamines, polyimides, polyamides, alkyl carbonate based polymers, polynitriles, and combinations thereof. The conductive linear or branched polymers can also be used in combination with polysiloxanes, polyphosphazines, polyolefins, and/or polydienes to form the conductive phase.

In another exemplary embodiment, the conductive phase is made of comb (or branched) polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, nitrile groups, sulfones, thiols, polyethers, polyamines, polyimides, polyamides, alkyl carbonates, polynitriles, other polar groups, and combinations thereof.

Further details about polymers that can be used in the conductive phase can be found in U.S. Provisional Patent Application No. 61/056,688, filed May 28, 2008, U.S. Provisional Patent Application No. 61/091,626, filed Aug. 25, 2008, U.S. Provisional Patent Application No. 61/145,518 filed Jan. 16, 2009, U.S. Provisional Patent Application No. 61/145,507, filed Jan. 16, 2009, U.S. Provisional Patent Application No. 61/158,257 filed Mar. 6, 2009, and U.S. Provisional Patent Application No. 61/158,241, filed Mar. 6, 2009, all of which are included by reference herein.

Further details about polymers that can be used in the conductive phase can be found in International Application Number PCT/US09/45356, filed May 27, 2009, U.S. Provisional Patent Application No. 61/091,626, filed Aug. 25, 2008, U.S. Provisional Patent Application No. 61/145,518, filed Jan. 16, 2009, U.S. Provisional Patent Application No. 61/145,507, filed Jan. 16, 2009, U.S. Provisional Patent Application No. 61/158,257, filed Mar. 6, 2009, and U.S. Provisional Patent Application No. 61/158,241, filed Mar. 6, 2009, all of which are included by reference herein.

There are no particular restrictions on the electrolyte salt that can be used in the block copolymer electrolytes. Any electrolyte salt that includes the ion identified as the most desirable charge carrier for the application can be used. It is especially useful to use electrolyte salts that have a large dissociation constant within the polymer electrolyte.

Suitable examples include alkali metal salts, such as Li salts. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $B_{12}F_xH_{12-x}$, $B_{12}F_{12}$, $LiB(CN)_4$ and mixtures thereof.

In one embodiment of the invention, single ion conductors can be used with electrolyte salts or instead of electrolyte salts. Examples of single ion conductors include, but are not limited to sulfonamide salts, boron based salts, and sulfates groups.

In one embodiment of the invention, the structural phase can be made of polymers such as polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, polyxylenylether, fluorocarbons, such as polyvinylidene fluoride, or copolymers that contain styrene, methacrylate, or vinylpyridine, or mixtures thereof.

Additional species can be added to nanostructured block copolymer electrolytes to enhance the ionic conductivity, to enhance the mechanical properties, or to enhance any other properties that may be desirable.

The ionic conductivity of nanostructured block copolymer electrolyte materials can be improved by including one or more additives in the ionically conductive phase. An additive can improve ionic conductivity by lowering the degree of crystallinity, lowering the melting temperature, lowering the glass transition temperature, increasing chain mobility, or any combination of these. A high dielectric additive can aid dissociation of the salt, increasing the number of Li+ ions available for ion transport, and reducing the bulky Li+[salt] complexes. Additives that weaken the interaction between Li+ and PEO chains/anions, thereby making it easier for Li+ ions to diffuse, may be included in the conductive phase. The additives that enhance ionic conductivity can be broadly classified in the following categories: low molecular weight conductive polymers, ceramic particles, room temp ionic liquids (RTILs), high dielectric organic plasticizers, and Lewis acids.

Other additives can be used in the polymer electrolytes described herein. For example, additives that help with overcharge protection, provide stable SEI (solid electrolyte interface) layers, and/or improve electrochemical stability can be used. Such additives are well known to people with ordinary skill in the art. Additives that make the polymers easier to process, such as plasticizers, can also be used.

Further details about block copolymer electrolytes are described in U.S. patent application Ser. No. 12/225,934, filed Oct. 1, 2008, U.S. patent application Ser. No. 12/271,1828, filed Nov. 14, 2008, and PCT Patent Application Number PCT/US09/31356, filed Jan. 16, 2009, all of which are included by reference herein.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

What is claimed is:

1. A cathode for an electrochemical cell comprising:
   a solid polymer electrolyte comprising a plurality of voids; and
   nanoparticles comprising active material and distributed within and throughout the solid polymer electrolyte,
   wherein the plurality of voids is compressible such that upon incorporation of the active material into the nanoparticles, the solid polymer electrolyte expands into the plurality of voids.

2. The cathode of claim 1, further comprising a binder to bind the nanoparticles within the cathode.

3. The cathode of claim 2, wherein the binder comprises polyvinylidene fluoride.

4. The cathode of claim 1, wherein the cathode contains no additional electrolytes.

5. The cathode of claim 1, wherein the solid polymer electrolyte has a yield strain of 50%-500% and an elastic modulus of greater than $1 \times 10^5$ Pa.

6. The cathode of claim 1, wherein the nanoparticles are selected from the group consisting of nanorods, nanowires, and nanotubes.

7. The cathode of claim 1, wherein the nanoparticles comprise $FeS_2$, $FeOF$, $FeF_3$, $FeF_2$, $MoO_3$, sulfur, lithium polysulfides, $CuO$, $Cu_2O$, $FeO$, $Fe_2O_3$, $V_6O_{13}$, $VO_2$, $Li_{1+x}V_3O_8$ ($0 \leq x \leq 3$), $Ag_xV_2O_5$ ($0 < x \leq 2$), $Cu_xV_4O_{11}$ ($0 < x \leq 3$), $VOPO_4$, $LiCoO_2$, lithium iron phosphate (LFP), nickel-cobalt manganese (NCM), nickel cobalt aluminum (NCA), or mixtures thereof.

8. The cathode of claim 1, wherein the nanoparticles comprise $V_2O_5$.

9. The cathode of claim 1, wherein the nanoparticles comprise sulfur.

10. The cathode of claim 1, wherein the nanoparticles comprise lithium polysulfides.

11. The cathode of claim 1, wherein the nanoparticles comprise a metal oxide.

12. The cathode of claim 1, wherein the nanoparticles have no dimension larger than their critical fracture length.

13. The cathode of claim 1, wherein the nanoparticles have no more than one dimension larger than their critical fracture length.

14. The cathode of claim 1, wherein the nanoparticles are approximately equiaxed and have a diameter between about 5 nm and 1 µm.

15. The cathode of claim 1, wherein the nanoparticles are approximately equiaxed and have a diameter between about 5 nm and 500 nm.

16. The cathode of claim 1, wherein the nanoparticles are approximately equiaxed and have a diameter between about 5 nm and 100 nm.

17. The cathode of claim 1, wherein the nanoparticles are approximately equiaxed and have a diameter between about 5 nm and 50 nm.

18. The cathode of claim 1, wherein the nanoparticles are linear and have a diameter between about 1 nm and 1 µm.

19. The cathode of claim 1, wherein the nanoparticles are linear and have a diameter between about 1 nm and 500 nm.

20. The cathode of claim 1, wherein the nanoparticles are linear and have a diameter between about 1 nm and 100 nm.

21. The cathode of claim 1, wherein the plurality of voids has a total volume no smaller than four times the total volume of the nanoparticles before lithiation.

22. The cathode of claim 1, wherein the plurality of voids has a total volume no smaller than three times the total volume of the nanoparticles before lithiation.

23. The cathode of claim 1, wherein the plurality of voids has a total volume no smaller than two and a half times the total volume of the nanoparticles before lithiation.

24. The cathode of claim 1, wherein the plurality of voids has a total volume no smaller than twice the total volume of the nanoparticles before lithiation.

25. The cathode of claim 1, wherein the voids have a volume that is between about 10% and 60% of the cathode.

26. The cathode of claim 1, further comprising between about 0 and 10 weight percent conductive carbon particles.

27. The cathode of claim 1, wherein the solid polymer electrolyte comprises one or more polymers selected from the group consisting of the following optionally cross-linked polymers: polyethylene oxide, polysulfone, polyacrylonitrile, siloxane, polyether, polyamine, linear copolymers containing ethers or amines, ethylene carbonate based polymers, Nafion, and polysiloxane grafted with small molecules or oligomers that include polyethers and/or alkylcarbonates.

28. The cathode of claim 1, wherein the solid polymer electrolyte comprises a block copolymer.

29. The cathode of claim 28, wherein the solid polymer electrolyte further comprises at least one lithium salt.

30. The cathode of claim 28, wherein the block copolymer is a diblock copolymer or a triblock copolymer.

31. The cathode of claim 30, wherein the block copolymer comprises at least a first block and a second block, wherein the first block is ionically conductive.

32. The cathode of claim 31, wherein the first block is selected from the group consisting of polyethers, polyamines, polyimides, polyamides, alkyl carbonate based polymers, polynitriles, polysiloxanes, polyphosphazines, polyolefins, polydienes, and combinations thereof.

33. The cathode of claim 31, wherein the second block is selected from the group consisting of polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, polyxylenylether, fluorocarbons, polyvinylidene fluoride, and copolymers that contain styrene, methacrylate, and/or vinylpyridine.

34. The cathode of claim 28, wherein the block copolymer is nanostructured.

35. The cathode of claim 28, wherein the block polymer comprises a plurality of blocks, and wherein the plurality of blocks is cross-linked.

36. The cathode of claim 31, wherein the first block comprises an ionically-conductive comb polymer, which comb polymer comprises a backbone and a pendant group.

37. A battery comprising:
a cathode according to claim 1; and
an anode spaced apart from the cathode.

38. The cathode of claim 1, wherein the plurality of voids does not contain the nanoparticles.

39. The cathode of claim 36, wherein the backbone comprises a polysiloxane, polyphosphazine, polyether, polydiene, polyolefin, polyacrylate, polymethacrylate, or combinations thereof.

40. The cathode of claim 36, wherein the pendant group comprises an oligoether, substituted oligoether, nitrile group, sulfone, thiol, polyether, polyamine, polyimide, polyamide, alkyl carbonate, polynitrile, other polar group, or combinations thereof.

* * * * *